US006359898B1

United States Patent
Cudak et al.

(10) Patent No.: US 6,359,898 B1
(45) Date of Patent: Mar. 19, 2002

(54) METHOD FOR PERFORMING A COUNTDOWN FUNCTION DURING A MOBILE-ORIGINATED TRANSFER FOR A PACKET RADIO SYSTEM

(75) Inventors: Mark Conrad Cudak, McHenry; Dominic Michael Tolli, Libertyville; Jeffrey Charles Smolinske, Schaumburg, all of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/141,835

(22) Filed: Aug. 28, 1998

Related U.S. Application Data

(60) Provisional application No. 60/057,327, filed on Sep. 2, 1997.

(51) Int. Cl.[7] ............ H04B 7/212; H04Q 7/00; H04Q 7/20; H04L 12/43; H04J 3/16
(52) U.S. Cl. ............ 370/442; 370/329; 370/458; 370/468; 455/464
(58) Field of Search ............ 370/310, 314, 370/329, 347–348, 442–443, 437, 458, 465, 468; 455/464, 575

(56) References Cited

U.S. PATENT DOCUMENTS 5,926,469 A * 7/1999 Norstedt et al. ............ 370/329
6,031,832 A * 2/2000 Turina ............ 370/348

FOREIGN PATENT DOCUMENTS

| WO | WO 98/44639 | * 10/1998 |
| WO | WO 98/44755 | * 10/1998 |

OTHER PUBLICATIONS

GSM Technical Specification 03.64 version 1.1.0 (Jan. 27, 1997).

* cited by examiner

Primary Examiner—Wellington Chin
Assistant Examiner—Maikhanh Tran
(74) Attorney, Agent, or Firm—Heather L. Mansfield

(57) ABSTRACT

The method for transmitting a communication signal comprising a plurality of units of information includes transmitting the plurality of units of information via a predetermined number of channel resources; determining a number of the plurality of units remaining in at least a portion of the communication signal; based on the predetermined number of channel resources, adjusting the number of the plurality of units remaining to produce an adjusted number of units remaining; and transmitting the adjusted number of units remaining to the wireless communication system.

11 Claims, 2 Drawing Sheets

METHOD FOR PERFORMING A COUNTDOWN FUNCTION DURING A MOBILE-ORIGINATED TRANSFER FOR A PACKET RADIO SYSTEM

This appln claims benefit of Provisional appln No. 60/057,327, filed Feb. 9, 1997.

TECHNICAL FIELD

This invention relates generally to packet information transmission and more particularly to early determination of a transmission block count which allows subsequent quick release of the transmission resources.

BACKGROUND OF THE INVENTION

Cellular radio telephone systems typically include subscriber units (such as mobile portable units) which communicate with network communications units (such as a fixed ground base station or an orbiting satellite base station) via radio frequency (RF) transmission. A typical communication network includes at least a base station and a switching center. In a packet radio system, information is transmitted in packets comprised of data blocks. Within the Global System for Mobile communications specification (GSM) 03.64 version 1.1.0, a countdown variable is used by a Mobile Station (MS) to identify the final data blocks in a packet of a mobile-originated transmission.

Ideally, the countdown procedure should commence with enough time to allow the network sufficient advance warning of the impending completion of the packet transmission. The earlier the network has this knowledge, the more intelligently it can allocate transmit resources for other MSs. When several time slots are being utilized during the mobile-originated transfer, the block countdown allows the MS to complete transmission several block frames before the network has knowledge of the impending completion. This is due to the channel and processing delays, the combination of which is several block frames in duration. As a result of this phenomenon, the network has not been able to reassign bandwidth to other MSs. Thus, the network continues to allocate blocks to a MS which has already completed its transmission and in the process wastes valuable transmission resources.

DETAILED DESCRIPTION OF THE DRAWINGS

In a preferred embodiment, the present invention operates in a time division multiple access wireless communication system such as a GSM system. Packet data logical channels are supported by a radio subsystem in accordance with the GSM Technical Specification "Project Scheduling and Open Issues" GSM 10.60. A new Countdown Value (CV) field is proposed for inclusion within the Radio Link Control (RLC) Data Block header, utilizing the bits of the Power Control (PC) field. The PC function is not utilized for blocks transmitted on the uplink.

Figure 1:
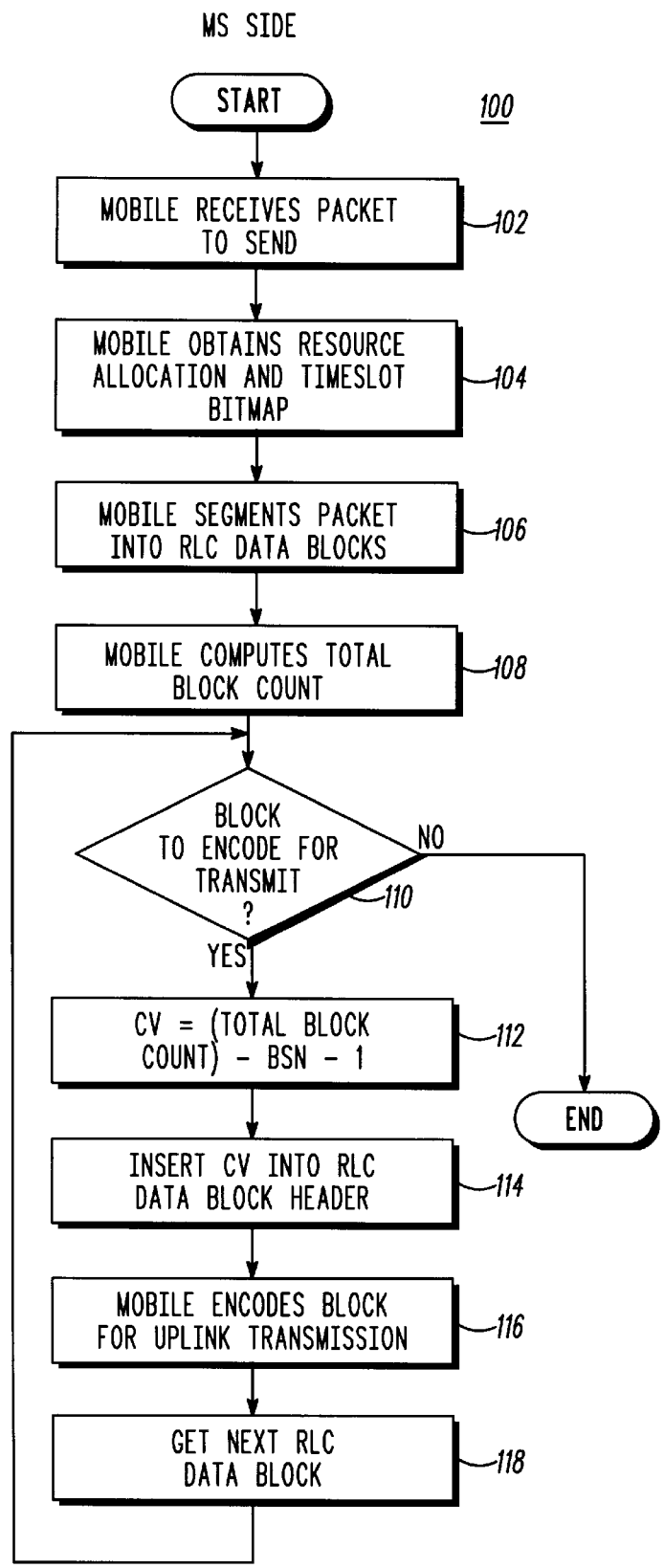
FIG. 1 is a flow chart illustrating a method for transmitting a communication signal according to a preferred embodiment of the present invention.

As shown in the flowchart 100 of FIG. 1, on the mobile station side a mobile station receives a packet to send at step 102. After obtaining the resource allocation and time slot bit map at step 104, the mobile station segments the packet at step 106 into RLC data blocks. At step 108, instead of transmitting the count of remaining blocks to transmit, the CV is calculated by dividing the remaining block count by the number of time slots being utilized for the transfer as indicated in the Timeslot Bitmap field of the assignment message. The integer portion of this operation is retained, limited in size to the maximum value allowed by the field width, while the remainder from the division operation is discarded. For integer results too large to be signaled using the available bits of the Countdown Value, the maximal value shall be sent. This new CV estimates the number of block frames remaining in the transfer.

By obtaining several (as few as two) pairs of Block Sequence Numbers (BSNs, also contained within the RLC Data Block header) and CVs from successfully received RLC Data Blocks, the network can perform simple math to determine the intended total block count of the transfer. Additionally, this information is conveyed to the network much earlier in time by using a block frame estimate than the current method for counting down.

An iterative routine is entered at step 110, and as shown at step 112, the CV can be computed during the segmentation operation, just as the current method allows. For a single-slot MS, the CV is equivalent to a method counting down the discrete number of remaining blocks, since in that case the number of blocks is the same as the block frame estimate. However, for all other multi-slot classes, the proposed method prevents the wasting of transmission resources by improving the response time of the network allocation engine. The mobile station inserts the CV into the RLC data block header, encodes the block for uplink transmission and obtains the next RLC data block at steps 114, 116 and 118, respectively.

The Countdown Value provides the network with the ability to accurately estimate and exactly calculate the total block count for the transmission, particularly when such information previously has not been indicated. As shown in the flowchart 200 of FIG. 2, upon network reception of a new RLC data block at step 202, at step 204 the first block whose Countdown Value is less than the maximum, the network shall monitor subsequent Countdown Values in order to determine the number of blocks remaining in the transmission. The total block count may be computed if one of the following two conditions is satisfied:

$BSN2-BSN1=YN+1$ and $CV1-CV2=Y+1$;            Condition A:

then, the total block count=$BSN2+((CV2+1)*N)$ $BSN2-BSN1=YN-1$ and $CV1-CV2=Y-1$ (note:$Y>0$)      Condition B:

then, the total block count=$BSN2+1+(CV2*N)$
Where,
   N=number of slots in timeslot bitmap (>0)
   Y=some non-negative integer (>=0)
   BSN1=block sequence number of some block #1
   CV1=Countdown Value of block #1 (>=0)
   BSN2=block sequence number of some block #2
   CV2=Countdown Value of block #2 (>=0)
   BSN1<BSN2
   BSN>=0
   CV =remaining blocks to send/N
=(total block count−BSN−1)/N 0<=CV<N [no more than one of the CVs can equal (N−1)]

Figure 2:
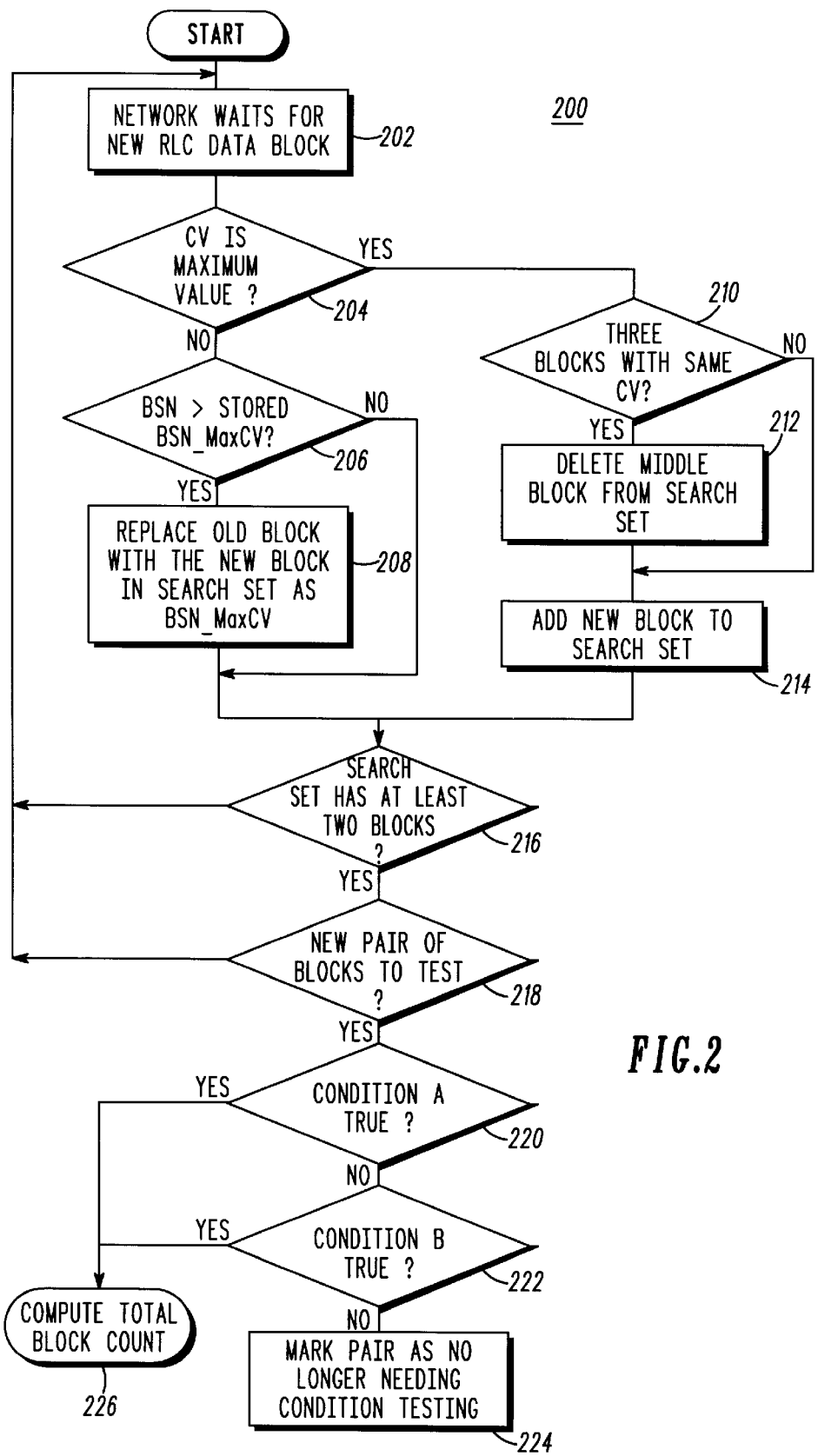
FIG. 2 is a flow chart illustrating a method for computing a total transmission block count in a wireless communications system according to a preferred embodiment of the present invention.

Thus, in the preferred embodiment of the present invention, prior to performing the above tests, a block may merit inclusion in the search set in accordance with the steps shown in FIG. 2 (206–226):

if CV=max, store block in search set if it has the largest BSN if CV<max, add block to search set if # of blocks in search set>1, perform tests A & B above on each pair of blocks in search set (only needs to be done once per pair)

According to the suggested block gathering algorithm above, for each block added to the search set, the number of tests which must be performed to find a pair satisfying conditions A or B above (two tests per pair) increases as illustrated by Eqns. 1.1 and 1.2.

$$z*(z-1), \qquad \text{Eqn. 1.1}$$

where z is the smaller set size, to $$z*(z+1). \qquad \text{Eqn. 1.2}$$

This results in an increase of (2*z) tests per added block.

While the total number of tests to perform may seem to increase significantly for each added block, not every pair comparison needs to be made. This is because comparisons already performed on block pairs are still valid. Thus, a maximum of (2*z) tests only need to be performed when blocks are newly added, where z is the former size of the search set. Additionally, it is not anticipated that many blocks will be necessary to perform this search. While true that only specific blocks (those residing on the "boundaries" where the Countdown Value changes) can be utilized to satisfy one of the tests above, the Table I below describes the set of these key blocks.

TABLE I

| Timeslots in bitmap | Number of boundary blocks | Total blocks CV is valid | Percentage of Total |
|---|---|---|---|
| 1 | 8 | 8 | 100 |
| 2 | 15 | 15 | 100 |
| 3 | 15 | 22 | 68 |
| 4 | 15 | 29 | 52 |
| 5 | 15 | 36 | 42 |
| 6 | 15 | 43 | 35 |
| 7 | 15 | 50 | 30 |
| 8 | 15 | 57 | 26 |

Table I shows results when utilizing a three-bit countdown field. The corresponding results for the final column with a four-bit countdown field are within 1% of those shown. Note that only a handful of blocks needs to be gathered for the one and two timeslot cases. As two appropriate search set blocks must be gathered, and not all sets of two boundary blocks will satisfy a test (each block may be appropriate for separate tests), on average more search set blocks than indicated above by the final column may need to be gathered when multiple timeslots are utilized. For instance, more than four search set blocks likely will need to be gathered for the 8-slot user case. As 74% (for the 8-slot case) of the total blocks whose Countdown Value can be utilized for the tests cannot be used to determine the total block count, a larger number of blocks (perhaps ten) may be required before a successful pair is found within the search set.

However, the transmission, and therefore the reception, of blocks will be somewhat sequential rather than random. This reception pattern should allow an appropriate block pair to be received successfully sooner than when the blocks are sent in a random or non-ordered scheme. Additionally, certain search set blocks may be removed from consideration if it can be detected that they cannot be boundary blocks. For instance, when test B above fails but the Countdown Value does not change between two blocks with increasing sequence number, one of the blocks will be eliminated from the search set. Also, reception of blocks which are not added to the search set delays the time at which tests need to be performed. This correspondingly increases the likelihood of later receiving a boundary block. Finally, the relatively low (under 10%) block error rate should make successful block reception a common event, preserving the sequential order of the received blocks.

For all these reasons, restricted computational resources will not be consumed by the increasing number of simple tests performed when the search set increases in size, even when the timeslot utilization is high. The simple algorithm above will allow the detection of the total block count when using the newly-proposed CV quicker than with the currently defined countdown field The countdown variable is to utilize the PC field of the RLC Data Block header. The PC field is not used for uplink data transfers, providing a location for the countdown field. The bits of the field count down the final blocks of the transfer so that the network may recognize the impending completion of data block transfer.

We claim:

1. In a wireless communication system, a method for transmitting a communication signal comprising a plurality of units of information, the method comprising:

transmitting the plurality of units of information via a predetermined number of channel resources;

determining a number of the plurality of units remaining in at least a portion of the communication signal;

based on the predetermined number of channel resources, adjusting the number of the plurality of units remaining to produce an adjusted number of units remaining; and transmitting the adjusted number of units remaining to the wireless communication system.

2. The method according to claim 1, wherein the step of adjusting further comprises:

dividing the number of the plurality of units remaining by the predetermined number of channel resources.

3. The method according to claim 2, wherein the adjusted number of units remaining comprises a quotient resulting from the step of dividing.

4. The method according to claim 1, further comprising:

prior to the step of determining, detecting that the communication signal should be transferred to another communication unit.

5. The method according to claim 1, wherein the predetermined number of channel resources is greater than one.

6. The method according to claim 1, wherein the wireless communication system comprises a time division multiple access communication system.

7. The method according to claim 6, wherein each of the predetermined channel resources comprises a time slot.

8. The method according to claim 7, wherein the step of transmitting further comprises:

inserting the adjusted number of units remaining into a power control field of each of the time slots.

9. A method for allocating channel resources in a wireless communication system, comprising:

receiving a communication signal comprising a plurality of units of information, the communication signal transmitted via a predetermined number of channel resources;

examining the communication signal to determine a number of the plurality of units to be received, the number of the plurality of units to be received representing a number of the plurality of units remainig in at least a portion of the communication signal, the number of the plurality of units remaining adjusted based on the predetermined number of channel resources; and based on the number of the plurality of units to be received, allocating the predetermined number of channel resources.

10. The method according to claim 9, wherein the number of the plurality of units to be received represents a quotient resulting from a division of the number of the plurality of units remaining by the predetermined number of channel resources.

11. The method according to claim 9, wherein the step of examining the communication signal comprises examining a power control field.

* * * * *